United States Patent [19]

Drent et al.

[11] Patent Number: 4,970,266

[45] Date of Patent: Nov. 13, 1990

[54] PROCESS FOR THE PREPARATION OF FUNCTIONALIZED POLYMERS

[75] Inventors: Eit Drent; Antonius A. Broekhuis, both of Amsterdam, Netherlands

[73] Assignee: Shell Oil Company, Houston, Tex.

[21] Appl. No.: 464,467

[22] Filed: Jan. 12, 1990

Related U.S. Application Data

[62] Division of Ser. No. 255,232, Oct. 11, 1988, Pat. No. 4,927,892.

[30] Foreign Application Priority Data

Oct. 14, 1987 [GB] United Kingdom ............... 8724108

[51] Int. Cl.$^5$ ................................................ C08F 8/00
[52] U.S. Cl. .................... 525/340; 525/332.8; 525/332.9; 525/333.1; 525/333.2; 525/383
[58] Field of Search ................................. 525/340, 383

[56] References Cited

U.S. PATENT DOCUMENTS 3,539,654 11/1970 Pautraut et al. ................. 260/768
3,776,981 12/1973 Winkler et al. ................ 260/880 B

FOREIGN PATENT DOCUMENTS 106379 4/1984 European Pat. Off. .
148592 7/1985 European Pat. Off. .
227160 7/1987 European Pat. Off. .

*Primary Examiner*—Bernard Lipman

[57] ABSTRACT

The present invention relates to a process for the preparation of a functionalized polymer comprising reacting a polymer or copolymer of a conjugated diene, at least part of the (co)polymer being formed by 1,2-polymerization, with (a) CO and (b) water and/or an alcohol, in the presence of (i) a Pd compound, (ii) a ligand and (iii) an acid, except hydrohalogenic acids.

8 Claims, No Drawings

PROCESS FOR THE PREPARATION OF FUNCTIONALIZED POLYMERS

This is a division, of Ser. No. 255,232, filed Oct. 11, 1988 now U.S. Pat. No. 4,927,892.

BACKGROUND OF THE INVENTION

The invention relates to a process for the preparation of functionalized polymers, and to the resulting functionalized polymers.

The production of hydroxyl and carbonyl compounds by reacting olefins with carbon monoxide and hydrogen is known. The products contain, as a rule, one more carbon atom than the reacting olefin. The reaction requires a hydrocarbon-soluble catalyst, usually one containing cobalt, iron, nickel or rhodium atoms, i.e., metals selected from Group 8 of the Periodic Table of the Elements, in complex bond with at least one ligand consisting of a carbon monoxide molecule and often a second ligand containing an organic compound of an atom, such as phosphorus or arsenic, selected from Group 5a of the Periodic Table.

British patent specification 1,378,185 concerns a process for preparing a hydroxylated block copolymer by reacting, with carbon monoxide and hydrogen, an unsaturated block copolymer having at least one polymer block of an aromatic mono-alpha-alkenyl hydrocarbon and at least one polymer block of a conjugated diene hydrocarbon wherein the polymer block of the conjugated diene has a 1,2 or 3,4 microstructure content of between 0% and 30% and a 1,4 microstructure content of between 100% and 70%, the reaction with carbon monoxide and hydrogen being continued until substantially all of the unsaturation of the conjugated diene block(s) is removed, 10–100% thereof being replaced by hydroxymethyl groups and 90–0% thereof being replaced by hydrogen atoms. This known process may be carried out as a one-step process, but then relatively high hydrogen pressures are required.

Conversion of conjugated diene monomers into a polydiene block occurs in several ways using the lithium based catalysts, preferably lithium alkyls, employed according to the prior art. Polymerization of butadiene leads to a mixture of several types of polymer microstructures, known as cis-1,4, trans-1,4 and 1,2 microstructures. In the cis-1,4 and trans-1,4 structures, carbon arrangement is all in a line and no small side chains are formed; thus, the double bonds produced are internal in the backbone chain. In the 1,2 microstructure, a two-carbon vinyl group is present as a short side chain directly attached to the two remaining carbon atoms of the original diene monomer unit. All three types of microstructure may be present in a polydiene block, but conditions are known in the art to maximize or minimize any of the three types if so desired.

A fourth type of microstructure known as 3,4 structure is also formed when substituted conjugated diolefins are polymerized. This is the case when isoprene is used. Statements herein about polymers having 1,2 structure also apply to polymers having 3,4 microstructure.

SUMMARY OF THE INVENTION

A process for the preparation of a functionalized polymer has now been found which can be carried out using carbon monoxide of a relatively low pressure and one step and the presence of hydrogen not being required.

Accordingly, the invention provides a process for the preparation of a functionalized polymer, which process comprises reacting a polymer or copolymer of a conjugated diene hydrocarbon, at least part of said polymer or copolymer being formed by 1,2-polymerization, with (a) carbon monoxide and (b) water and/or an alcohol, in the presence of a catalytic system which may be prepared by combining (i) a palladium compound, (ii) a ligand and (iii) an acid, except hydrohalogenic acids.

The process according to the present invention may be represented by means of, for example, the following equations:

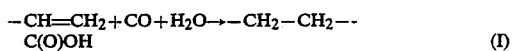  (I)

and

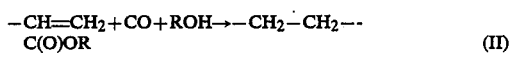  (II)

in which the vinyl groups form the 1,2 microstructure of the polymer of the conjugated diene hydrocarbon. According to equation I a carboxylic acid is formed; in equation II, R representing a hydrocarbon group, an ester is formed. Both equations represent so-called carbonylations.

Depending on the characteristics of the starting polymer of a conjugated diene hydrocarbon the functionalized polymer obtained will be elastomeric or almost plastic in character. The properties of the functionalized polymer also depend on the extent of carbonylation of the polymer. If the polymer is highly carbonylated the functionalized polymer is a plastic. The solvent resistance and weatherability of the functionalized polymer are also controlled by the extent of carbonylation. The functionalized polymers can also be moulded.

The catalytic system is preferably homogeneous but may be heterogeneous. Palladium compounds which form homogeneous catalytic systems are salts of divalent palladium. Pd(II) salts of alkanoic acids are preferred, particularly those having not more than twelve carbon atoms per molecule. The use of Pd(II) acetate is most preferred. Other examples of suitable Pd(II) salts are those of nitric acid and sulphuric acid. Salts of hydrohalogenic acids may, in principle, be used as well, but they have the drawback that the halogen ion may have a corrosive effect. Moreover, palladium complexes may be used, for instance palladium acetylacetonate, tetrakistriphenylphosphinepalladium, bis-tri-o-tolylphosphinepalladium acetate or bis-triphenylphosphinepalladium sulphate. Palladium on charcoal and palladium bound to an ion exchanger—for instance an ion exchanger comprising sulphonic acid groups—are examples of suitable heterogeneous catalysts.

DETAILED DESCRIPTION OF THE INVENTION

According to a preferred embodiment of the present invention the ligand used for the preparation of the catalytic system is a phosphine having the general formula A

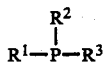  (A)

in which $R^1$, $R^2$ and $R^3$ each represent an optionally substituted aryl group and the acid has a $pK_a$ below 2, measured at 18° C. in aqueous solution, and is not a carboxylic acid.

The optionally substituted aryl groups $R^1$, $R^2$ and $R^3$ in the general formula (A) preferably contain not more than 18, in particular in the range of from 6 to 14, carbon atoms. Examples of suitable $R^1$, $R^2$ and $R^3$ groups are the naphthyl group and in particular the phenyl group. Suitable substituents are halogen atoms and alkyl, aryl, alkoxy, carboxy, carbalkoxy, acyl, trihalogenmethyl, cyano, dialkylamino, sulphonylalkyl and alkanoyloxy groups. Examples of suitable phosphines are tri-p-tolylphosphine, tri-p-methoxyphenylphosphine, o-diphenylphosphinobenzoic acid and, in particular, triphenylphosphine.

According to another preferred embodiment of the present invention the ligand used for the preparation of the catalytic system is bidentate and has the general formula B

(B)

in which $R^1$, $R^2$ and $R^3$ have the same meaning as in the general formula A, $R^4$ represents an optionally substituted aryl group and Q represents an organic bridging group having in the range of from 2 to 6 carbon atoms in the bridge. $R^4$ may have the same substituents as mentioned hereinbefore for $R^1$, $R^2$ and $R^3$. The organic bridging group Q may carry substituents, such as a methyl group, but is preferably a polymethylene group. Very good results have been obtained with 1,4-di(diphenylphosphino)butane. Other examples of bidentate ligands of the general formula B are 1,3-di(diphenylphosphino)propane, 1,2-di(diphenylphosphino)ethane, 1,5-di(diphenylphosphino)pentane and 1,6-di(diphenylphosphino)hexane.

The acids having a $pK_a$ below 2 preferably have a non-co-ordinating anion, by which is meant that little or no co-valent interaction takes place between the palladium and the anion. Typical examples of such anions are $PF_6$, $SbF_6$, $BF_4$ and $ClO_4$.

Acids preferably used are, for instance, sulphonic acids and those acids that can be formed, possibly in situ, by interaction of a Lewis acid such as, for example, $BF_3$, $AsF_5$, $SbF_5$, $PF_5$, $TaF_5$ or $NbF_5$ with a Broensted acid such as, for example, a hydrohalogenic acid, in particular HF, fluorosulphonic acid, phosphoric acid or sulphuric acid. Specific examples of the last-named type of acids are fluorosilicic acid, $HBF_4$, $HPF_6$ and $HSbF_6$. Typical sulphonic acids that can be used are fluorosulphonic acid, chlorosulphonic acid and the sulphonic acids specified hereinafter.

A preferred group of acids has the general formula C

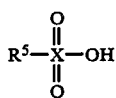
(C)

wherein X represents sulphur or chlorine and, if X represents chlorine, $R^5$ represents oxygen and if X represents sulphur, $R^5$ represents an OH group or an optionally substituted hydrocarbon group.

When the afore-mentioned acids are used in the process according to the present invention, the anions of the acids can be regarded as non-co-ordinating. In the acids having the general formula C, the optionally substituted hydrocarbon group, represented by $R^5$, is preferably an alkyl, aryl, aralkyl or alkaryl group with in the range of from 1 to 30, in particular 1 to 14, carbon atoms. The hydrocarbon group may be substituted with, for instance, halogen atoms, in particular fluorine atoms. Examples of suitable acids of the general formula C are perchloric acid, sulphuric acid, 2-hydroxypropane-2-sulphonic acid, p-toluenesulphonic acid and trifluoromethanesulphonic acid, with the latter two acids being preferred.

The process according to the present invention may also be carried out by using at least 1 mol of a non-carboxylic acid having a $pK_a$ greater than 2 and/or of a sterically hindered carboxylic acid having a $pK_a$ below 4.5, per mol of phosphine of the general formula B, the $pK_a$ values measured at 18° C. in aqueous solution.

Examples of non-carboxylic acids having a $pK_a$ greater than 2 and which are preferably used in the process according to the present invention are benzenephosphonic acid ($pK_a$=2.5), 2-bromobenzenephosphonic acid ($pK_a$= 2.1) and orthophosphoric acid ($pK_a$=2.1). Another example of such acids Is arsenic acid.

The carboxylic acid must be sterically hindered which means that atoms or groups of atoms are present which interfere with one another, thus counteracting esterification of the acid. Examples of such acids are 2,4,6-trimethylbenzoic acid and 2,6-dimethylbenzoic acid. It is preferred to apply sterically hindered carboxylic acids having a $pK_a$—measured at 18° C. in aqueous solution—below 2. Among the sterically hindered carboxylic acids preference is given to the sterically hindered benzoic acids, for example 2,6-dichlorobenzoic acid ($pK_a$=1.5). Other examples of sterically hindered benzoic acids are 2,6-difluorobenzoic acid, 2,4,6-trifluorobenzoic acid, 2,4,6-trichlorobenzoic acid, 2,6-dibromobenzoic acid, 2,4,6-tribromobenzoic acid, 2,6-diiodobenzoic acid and 2,4,6-triiodobenzoic acid. Modification of the process according to the present invention by replacing a sterically hindered carboxylic acid having a $pK_a$ below 4.5 with a sterically hindered carboxylic acid having a $pK_a$ above 4.5 results in an extremely low rate of carboxylation.

The upper limit for the molar ratio non-carboxylic acid having a $pK_a$ greater than 2 and/or sterically hindered carboxylic acid to phosphine of the general formula A is not critical. This molar ratio is preferably not more than 50, but the use of molar ratios higher than 50, for example up to 150, is not excluded.

The quantity of palladium compound is not critical. Preference is given to the use of quantities in the range of from $10^{-5}$ to $10^{-1}$ gram-atom palladium per mol of vinyl groups in the conjugated diene hydrocarbon.

The process according to the present invention may be carried out using a ratio of mol of the ligand per gram-atom of palladium and a ratio of equivalents of acid per gram-atom of palladium which are not critical and may vary within wide ranges. The former ratio is preferably at least 5 and in particular in the range of from 10 to 150 and the latter ratio is preferably in the range of from 1 to 50, thus promoting high reaction rates. However, the latter ratio may be as low as 0.01 or as high as 150.

The alcohols used in the process according to the present invention may be aliphatic, cycloaliphatic or aromatic and may be substituted with one or more substituents, for example with halogen atoms or cyano, ester, alkoxy, carboxyl or aryl groups. The alcohol may therefore be a phenol. The alcohol is preferably an alkanol, more preferably an alkanol having less than 20 carbon atoms per molecule and in particular an alkanol having in the range of from 1 to 5 carbon atoms per molecule. Methanol is most preferred. Other examples of suitable alcohols are ethanol, propanol, 2-propanol, isobutanol, tert.-butyl alcohol, stearyl alcohol, benzyl alcohol, cyclohexanol, chlorocapryl alcohol, ethylene glycol, 1,2-propanediol, 1,4-butanediol, glycerol, polyethylene glycol, I,6-hexanediol, phenol and cresol. If the alcohol has more than one hydroxyl group per molecule, a mono-ester may be formed.

In the process according to the invention the carbon monoxide may be used pure or diluted with an inert gas, such as nitrogen, a noble gas or carbon dioxide. Generally the presence of more than 10% by volume of hydrogen is undesirable, since under the reaction conditions it may cause hydrogenation of ethylenically unsaturated carbon carbon bonds. Preference is given to the use of carbon monoxide or a carbon monoxide containing gas which contains less than 5% by volume of hydrogen.

The process according to the present invention may be carried out using a great variety of polymers of conjugated diene hydrocarbons having 1,2 microstructure. The starting polymer may be a homopolymer or a copolymer of conjugated diene hydrocarbons, for example of 1,3-butadiene, 1,3-pentadiene, 2-methyl-1,3-butadiene (isoprene), 2,3-dimethyl-1,3-butadiene, 2-methyl-1,3-pentadiene or 2,3-dimethyl-1,3-pentadiene. Very good results have been obtained with polybutadiene. The starting polymer may also be a copolymer of a conjugated diene hydrocarbon, for example with an aromatic vinyl compound, which may be monoaromatic or poly-aromatic. Examples of aromatic vinyl compounds are styrene, 2-methylstyrene, 4-methylstyrene, 3,5-diethylstyrene, 4- -propylstyrene, 3,5-diphenylstyrene, 1-vinylnaphthalene, 3-ethyl-1-vinylnaphthalene and 8-phenyl-1-vinylnaphthalene. Where, for example, branching or cross-linking is desired a polyfunctional aromatic vinyl compound can be used, for example a divinylbenzene. The copolymers may be, for example, random, block copolymers or have a tapered structure. Very good results have been obtained with styrene-butadiene copolymers, in particular with block copolymers. When the content of aromatic vinyl compound in the block copolymer is small, the block copolymer is a so-called thermoplastic rubber. Block copolymers with a high aromatic vinyl compound content, such as more than 70% by weight, provide a resin. Many processes are known for the preparation of block copolymers, for example from U.S. patent specification 3,639,517.

Another example of block copolymers which may be used in the process according to the present invention are those described in U.S. patent specification Re 27,145 comprising those having a general structure

A—B—A wherein the two terminal polymer blocks A comprise thermoplastic polymer blocks of vinylarenes such as polystyrene, while block B is a selectively hydrogenated polymer block of a conjugated diene. The proportion of the thermoplastic terminal blocks to the centre elastomeric polymer block and the relative molecular weights of each of these blocks is balanced to obtain a rubber having an optimum combination of properties such that it behaves as a vulcanized rubber without requiring the actual step of vulcanization. Hydrogenation may be effected selectively as disclosed in U.S. patent specification Re 27,145. These selectively hydrogenated A—B—A block copolymers are deficient in many applications in which adhesion is required due to its hydrocarbon nature. Examples include the toughening and competibilization of polar polymers such as the engineering thermoplastics, the adhesion to high energy substrates of hydrogenated block copolymer elastomer based adhesives, sealants and coatings, and the use of hydrogenated elastomer in reinforced polymer systems. However, the placement onto the block copolymer of functional groups in agreement with the present invention, which groups can provide interactions not possible with hydrocarbon polymers solves the adhesion problem and extends the range of applicability of this material. In the process according to the present invention residual 1,2-microstructure left after the selective hydrogenation react according to the equations I or II described hereinbefore.

The molecular weight of the conjugated diene polymer or copolymer thereof is not critical and may vary within wide ranges, for example between 2,000 and 1,000,000.

The process according to the present invention may be carried out at a temperature and a pressure which are not critical and may vary within wide ranges, the temperature preferably in the range of from 50° C. to 200° C. and the overall pressure in the range of from 1 to 100 bar.

The process according to the present invention may be carried out using a molar ratio of vinyl groups in the conjugated diene hydrocarbon to water and/or alcohol which is not critical and may vary within wide ranges. This molar ratio usually lies in the range of from 0.1 to 10.

The process according to the present invention will usually be carried out in the presence of a solvent for the polymer of the conjugated diene hydrocarbon. Examples of such solvents are hydrocarbons such as cyclohexane, hexane, heptane, octane, benzene, toluene, the three xylenes, ethylbenzene and cumene. Mixtures of hydrocarbons may be used.

The process according to the present invention may be carried out batchwise, semi-continuously or continuously.

The functionalized polymer may be recovered in any suitable manner from the reaction product obtained in conformity with the present invention. For example, standard techniques, such as steam stripping or coagulation with a suitable non-solvent such as an alcohol, may be used. The coagulated or stripped functionalized polymer is then removed from the resulting medium by, for example, centrifugation or extrusion. Residual solvent and, if present, other volatiles can be removed from the isolated functionalized polymer by heating, optionally under reduced pressure or in a stream of air.

The following Examples further illustrate the invention.

EXAMPLE 1

A 300-ml magnetically stirred Hastelloy C autoclave ("Hastelloy" is a trade mark) was charged with the following materials solution of 9 g of rubber A in 100 ml cyclohexane
methanol 10 ml
palladium(II) acetate 0.4 mmol
toluene 50 ml
1,4-di(diphenylphosphino)butane 1.2 mmol
trimethylbenzoic acid 10 mmol Rubber A was a polybutadiene having a vinyl content of 39% by weight, a total real molecular weight of 28,000 and was prepared by lithius-initiated anionic polymerization.

The autoclave was flushed with carbon monoxide, filled with carbon monoxide until a pressure of 40 bar was obtained, heated to a temperature of 150° C. and kept at this temperature for 5 h. At the end of this period the autoclave was allowed to adopt ambient temperature, opened and the contents were analyzed by means of C13 NMR.

The product rubber had a vinyl content of 26% and a methoxycarbonyl content of 10%, both based on mol of butadiene.

EXAMPLE 2

An experiment was carried out as described in Example I, charging the autoclave with the following materials a solution of 9 g of rubber A in 100 ml cyclohexane
methanol 10 ml
palladium(II) acetate 0.4 mmol
toluene 50 ml
triphenylphosphine 10 mmol
p-toluenesulphonic acid 4 mmol Rubber A was the same as that used in Example 1.
The autoclave was kept for 3 h at 150° C.

The product rubber had a vinyl content of 6% and a methoxycarbonyl content of 10%, both based on mol of butadiene. Oxo groups other than those in the methoxycarbonyl groups were present in an amount of 8% mol, based on butadiene.

EXAMPLE 3

An experiment was carried out as described in Example 1, charging the autoclave with the following materials solution of 13 g of rubber B in 100 ml cyclohexane
methanol 15 ml
palladium(II) acetate 0.4 mmol
toluene 50 ml
triphenylphosphine 10 mmol
p-toluenesulphonic acid 4 mmol Rubber B was a styrene-butadiene block copolymer having a vinyl content of 44% by weight, calculated on butadiene; the total real molecular weight was 38,000 and that of styrene was 9,900.

The autoclave was kept for 5 h at 125° C.

The product rubber had a vinyl content of 12% mol and contained 10% mol of methoxycarbonyl groups, both based on the total of butadiene and styrene. Oxo groups other than those in the methoxycarbonyl groups were present in an amount of 4% mol, based on the total of butadiene and styrene.

EXAMPLE 4

An experiment was carried out as described in Example 1, charging the autoclave with the following materials a solution of 10 g of rubber C in 100 ml cyclohexane
methanol 10 ml
palladium(II) acetate 0.4 mmol
toluene 50 ml
triphenylphosphine 10 mmol
p-toluenesulphonic acid 4 mmol Rubber C was a polybutadiene having a vinyl content of 64% by weight and a total real molecular weight of 29,000 and was prepared by lithium-initiated anionic polymerization.

The autoclave was kept for 5 h at 125° C.

The product rubber had a vinyl content of 24% and a methoxycarbonyl content of 22%, both based on mol of butadiene. Oxo groups other than those in the methoxycarbonyl groups were present in an amount of 4% mol, based on butadiene.

EXAMPLE 5

An experiment was carried out as described in Example 1, charging the autoclave with the following materials solution of 6.5 g of rubber B in 50 ml cyclohexane
water 2.5 ml
palladium(II) acetate 0.4 mmol
1,4-dioxane 100 ml
triphenylphosphine 10 mmol
p-toluenesulphonic acid 4 mmol Rubber B was the same as that used in Example 3.
The autoclave was kept for 10 h at 125° C.

The product rubber had a vinyl content of 15% mol and a carbonyl content of 13% mol, both based on the total of butadiene and styrene. Oxo groups other than those in the carboxyl groups were present in an amount of 2.3% mol, based on the total of butadiene and styrene.

What is claimed is:

1. A process for the preparation of a functionalized polymer comprising reacting a polymer of a conjugated diene hydrocarbon or copolymer of a conjugated diene hydrocarbon and a vinyl aromatic compound, at least part of said polymer or copolymer being formed by 1,2-polymerization of the conjugated diene hydrocarbon, with (a) carbon monoxide and (b) water and/or an alcohol, in the presence of a catalytic system prepared by combining (i) a salt of divalent palladium, (ii) a phosphine ligand having the formula

in which $R^1$, $R^2$, $R^3$, and $R^4$ each represent an optionally substituted aryl group and Q represents an organic bridging group having in the range of from 2 to 6 carbon atoms in the bridge, and (iii) an acid, except hydrohalogenic acids, selected from a group consisting of acids having a non-coordinating anion and da pKa below 2, non-carboxylic acids having a pKa greater than 2, and sterically hindered carboxylic acids having a pKa below 4.5.

2. The process as claimed in claim 1 in which the conjugated diene hydrocarbon is 1,3-butadiene.

3. The process as claimed in claim 1 in which the polymer is a styrene-butadiene copolymer.

4. The process as claimed in claim 1 in which the salt of divalent palladium is a Pd(II) salt of an alkanoic acid.

5. The process as claimed in claim 1 in which palladium is present in the range of from $10^{-5}$ to $10^{-1}$ gram-atom palladium per mol of vinyl groups in the polymer or copolymer of the conjugated diene hydrocarbon, at least 5 mol of the phosphine ligand is present per gram-atom of palladium and said acid is present in the range of from 1 to 50 equivalents of the acid per gram-atom of palladium.

6. The process as claimed in claim 1 in which the alcohol is an alkanol having in the range of from 1 to 5 carbon atoms per molecule.

7. The process as claimed in claim 1 in which $R^1$, $R^2$, $R^3$, and $R^4$ in the general formula B represent phenyl groups.

8. The process as claimed in claim 7 in which the acid is trimethylbenzoic acid.

* * * * *